US008751517B2

(12) United States Patent
Umezu

(10) Patent No.: US 8,751,517 B2
(45) Date of Patent: Jun. 10, 2014

(54) INFORMATION PROCESSING APPARATUS, INFORMATION PROCESSING SYSTEM, INFORMATION PROCESSING METHOD, AND COMPUTER READABLE NON-TRANSITORY MEDIUM

(75) Inventor: Keisuke Umezu, Minato-ku (JP)

(73) Assignee: NEC Corporation, Tokyo (JP)

( * ) Notice: Subject to any disclaimer, the term of this patent is extended or adjusted under 35 U.S.C. 154(b) by 19 days.

(21) Appl. No.: 13/391,233

(22) PCT Filed: Jun. 23, 2010

(86) PCT No.: PCT/JP2010/061083
§ 371 (c)(1),
(2), (4) Date: Feb. 17, 2012

(87) PCT Pub. No.: WO2011/021442
PCT Pub. Date: Feb. 24, 2011

(65) Prior Publication Data
US 2012/0150892 A1    Jun. 14, 2012

(30) Foreign Application Priority Data
Aug. 18, 2009  (JP) .................................. 2009-188971

(51) Int. Cl.
*G06F 17/30*  (2006.01)
(52) U.S. Cl.
USPC ............ 707/758; 707/769; 707/776; 707/777
(58) Field of Classification Search
CPC ................................. G06F 17/30; G06F 17/00
See application file for complete search history.

(56) References Cited

U.S. PATENT DOCUMENTS

| 7,664,742 | B2 * | 2/2010 | Pettovello | 707/715 |
| 7,941,433 | B2 * | 5/2011 | Benson | 707/737 |
| 8,065,411 | B2 * | 11/2011 | Spiess et al. | 709/224 |

(Continued)

FOREIGN PATENT DOCUMENTS

| JP | 05-119903 A | 5/1993 |
| JP | 08-044518 A | 2/1996 |
| JP | 2001-022565 A | 1/2001 |
| JP | 2002-278672 A | 9/2002 |

OTHER PUBLICATIONS

Carnielli, Walter, et al., "Data, Schema, and Ontology Integration," Jul. 2004, Proceedings of ComboLog '04 Workshop on Combination of Logic: Theory and Application, pp. 1-204.*

(Continued)

*Primary Examiner* — Farhan Syed
(74) *Attorney, Agent, or Firm* — Sughrue Mion, PLLC

(57) ABSTRACT

In general information processing apparatuses, determination on what sort of operational interface is appropriate to be provided for which application (AP, hereinafter) is left up to the user.

An information processing apparatus in an exemplary embodiment of the present invention comprises: an operation-definition storage means for storing a record including a function name, a function ontology and an operation type, with respect to each of a plurality of applications (APs); and an operation modification means for acquiring from the above-mentioned operation-definition storage means a set of records having an identical function ontology (identical ontology set) or a set of identifiers of the records belonging to the identical ontology set, and for replacing an operation type of a record including the above-mentioned identical function ontology of a designated AP with an operation type having a high appearance frequency (high frequency type) in the identical ontology set.

11 Claims, 12 Drawing Sheets

(56) References Cited

U.S. PATENT DOCUMENTS

| | | | |
|---|---|---|---|
| 8,073,731 B1* | 12/2011 | Rajasenan | 705/7.42 |
| 8,131,838 B2* | 3/2012 | Bornhoevd et al. | 709/224 |
| 8,149,716 B2* | 4/2012 | Ramanathan et al. | 370/238 |
| 8,150,857 B2* | 4/2012 | Benson | 707/748 |
| 8,166,074 B2* | 4/2012 | Pettovello | 707/797 |
| 8,296,413 B2* | 10/2012 | Bornhoevd et al. | 709/224 |
| 8,343,738 B2* | 1/2013 | Millar et al. | 435/91.2 |
| 8,407,081 B1* | 3/2013 | Rajasenan | 705/7.42 |
| 2004/0103090 A1* | 5/2004 | Dogl et al. | 707/3 |
| 2005/0154713 A1* | 7/2005 | Glover et al. | 707/3 |
| 2006/0047704 A1* | 3/2006 | Gopalakrishnan | 707/104.1 |
| 2007/0112803 A1* | 5/2007 | Pettovello | 707/100 |
| 2007/0179971 A1* | 8/2007 | Benson | 707/103 R |
| 2007/0282988 A1* | 12/2007 | Bornhoevd et al. | 709/223 |
| 2007/0283002 A1* | 12/2007 | Bornhoevd et al. | 709/224 |
| 2008/0033951 A1* | 2/2008 | Benson | 707/8 |
| 2008/0155472 A1* | 6/2008 | Runge et al. | 715/811 |
| 2009/0029346 A1* | 1/2009 | Millar et al. | 435/5 |
| 2009/0083244 A1* | 3/2009 | Li et al. | 707/4 |
| 2009/0112903 A1* | 4/2009 | Liang et al. | 707/101 |
| 2009/0119095 A1* | 5/2009 | Beggelman et al. | 704/9 |
| 2009/0129316 A1* | 5/2009 | Ramanathan et al. | 370/328 |
| 2010/0041013 A1* | 2/2010 | Millar et al. | 435/5 |
| 2010/0131564 A1* | 5/2010 | Pettovello | 707/794 |
| 2011/0213799 A1* | 9/2011 | Benson | 707/769 |
| 2012/0166638 A1* | 6/2012 | Bornhoevd et al. | 709/224 |
| 2013/0060613 A1* | 3/2013 | Benson | 705/14.1 |

OTHER PUBLICATIONS

Doan, AnHai, et al., "Ontology Matching: A Machine Learning Approach," 2004, Springer-Verlag, pp. 385-403.*

* cited by examiner

Fig.3

| 40 AP NAME | 41 CONTEXT | 42 FUNCTION NAME | 43 FUNCTION ONTOLOGY | 44 OPERATION TYPE |
|---|---|---|---|---|
| PHONE CALL AP | NULL | START PHONE CALL | AppStart | DEPRESS CALL KEY |
| | | END PHONE CALL | AppStop | DEPRESS POWER KEY |
| | | HOLD | Pause | DEPRESS 5 KEY |
| | | TURN UP VOLUME | VolumeUp | DEPRESS UP KEY |
| | | TURN DOWN VOLUME | VolumeDown | DEPRESS DOWN KEY |
| | DRIVING | START PHONE CALL | AppStart | TOUCH DISPLAY |
| | | END PHONE CALL | AppStop | TOUCH DISPLAY TWICE |
| | | TURN UP VOLUME | VolumeUp | TURN HEADSET KNOB CLOCKWISE |
| | | TURN DOWN VOLUME | VolumeDown | TURN HEADSET KNOB COUNTERCLOCKWISE |
| | WALKING | ... | ... | ... |

45 RECORD

PHONE CALL AP

XXAP

Fig.9

| FUNCTION LIST FOR PHONE CALL APPLICATION (CONTEXT: WALKING) | | |
| --- | --- | --- |
| FUNCTION NAME | ONTOLOGY | OPERATION |
| START PHONE CALL | AppStart | TOUCH SCREEN |
| END PHONE CALL | AppStop | TOUCH SCREEN |
| TURN UP VOLUME | VolUp | DEPRESS UP KEY |
| TURN DOWN VOLUME | VolDown | DEPRESS DOWN KEY |
| HOLD | Pause | DEPRESS CALL KEY |
| VOICE MEMO | Recording | DEPRESS 1 KEY |
| LAUNCH PHONEBOOK | AddrBook | DEPRESS 3 KEY |

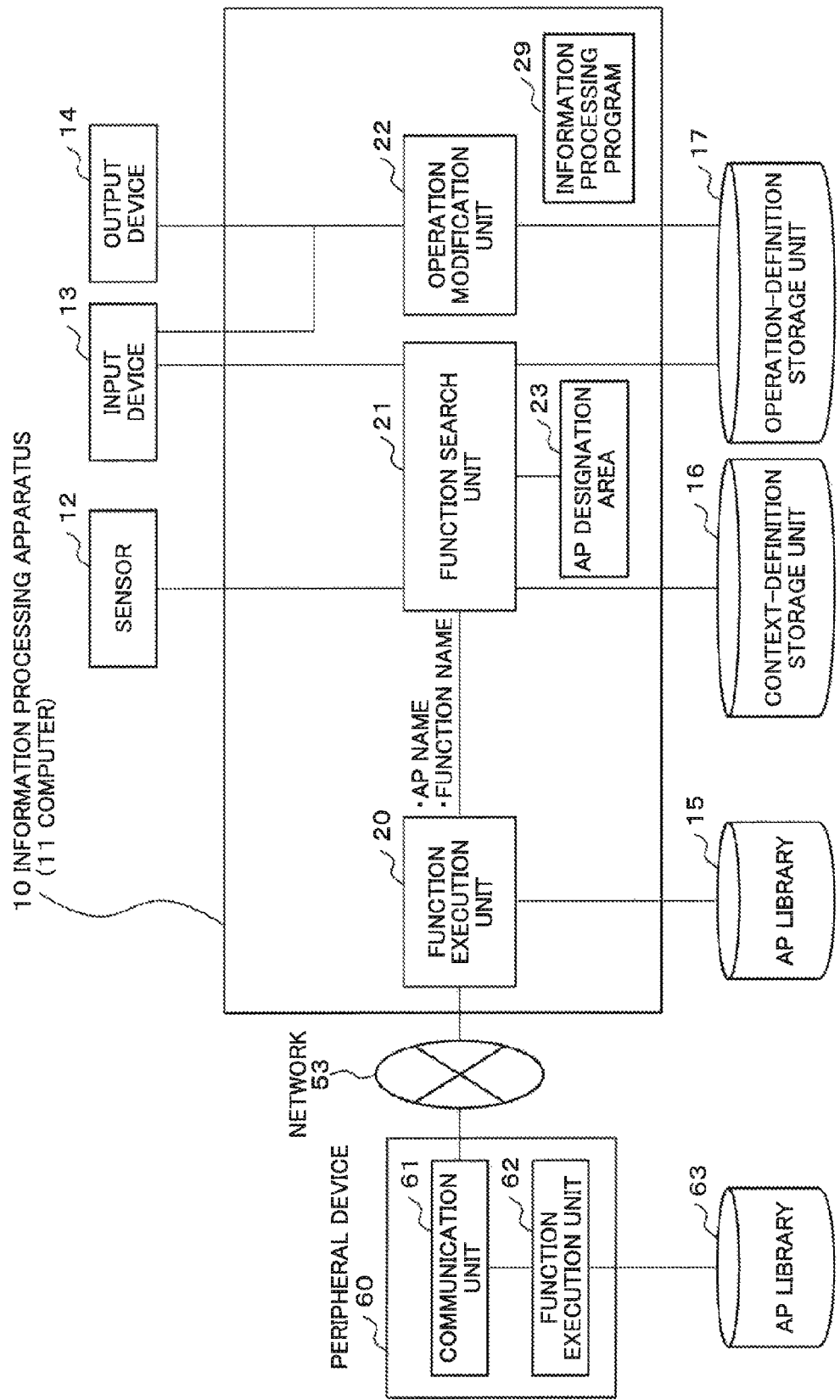

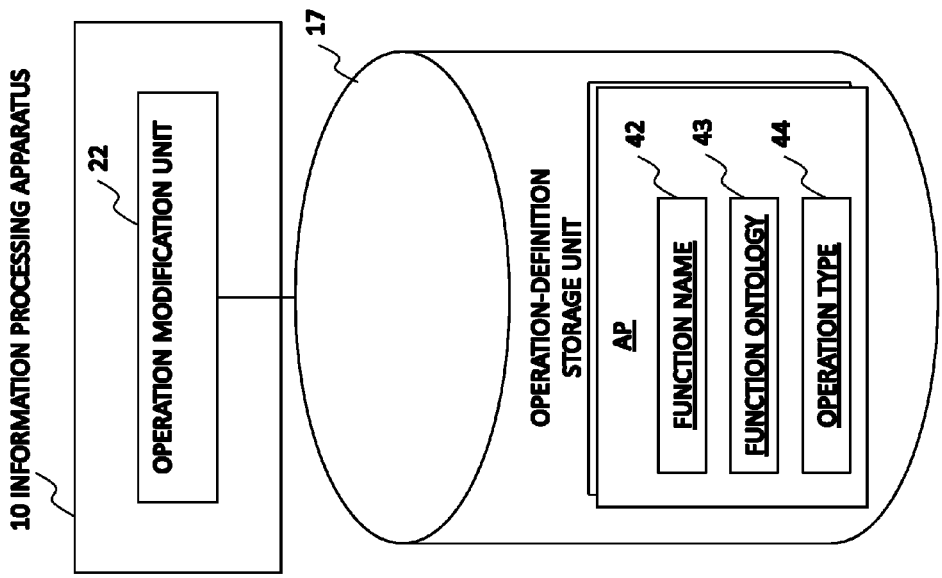

INFORMATION PROCESSING APPARATUS, INFORMATION PROCESSING SYSTEM, INFORMATION PROCESSING METHOD, AND COMPUTER READABLE NON-TRANSITORY MEDIUM

CROSS REFERENCE TO RELATED APPLICATIONS

This application is a National Stage of International Application No. PCT/JP2010/061083 filed Jun. 23, 2010, claiming priority based on Japanese Patent Application No. 2009-188971 filed Aug. 18, 2009 the contents of all of which are incorporated herein by reference in their entirety.

TECHNICAL FIELD

The present invention relates to an information processing apparatus, an information processing system, an information processing method and an information processing program, which are for setting an operational interface.

BACKGROUND ART

Patent Document 1 describes a method in which, as an alternate of a terminal function key whose purpose of use is determined with respect to each program, another terminal function key prepared in advance in a file is used.

Patent Document 2 describes a method in which various applications are controlled by unified key operations, by storing operation information on various applications in an external file and by recognizing information on a command of an input device through input operation and an integrated data monitor.

Patent Document 3 describes an apparatus in which, with respect to each application, a request for selecting an appropriate one from among connected control units is displayed, and the selected control unit is set as an input device for the corresponding application.

CITATION LIST

Patent Literature

[Patent Document 1] Japanese Patent Application Laid-Open No. 1993-119903
[Patent Document 2] Japanese Patent Application Laid-Open No. 1996-44518
[Patent Document 3] Japanese Patent Application Laid-Open No. 2002-278672

DISCLOSURE OF INVENTION

Technical Problem

All technologies described in the above-mentioned documents have a problem in that determination on what sort of operational interface is appropriate to be provided to which application (AP, hereinafter) is left up to the user. The objective of the present invention is to provide an information processing apparatus, an information processing system, an information processing method and an information processing program, all of which can solve the above-mentioned problem.

Solution to Problem

According to one aspect of the present invention, there is provided an information processing apparatus comprising: an operation-definition storage unit which stores a record including a function name, a function ontology and an operation type, with respect to each of a plurality of applications (APs); and an operation modification unit which acquires from the above-mentioned operation-definition storage unit a set of records having an identical function ontology (identical ontology set) or a set of identifiers of the records belonging to the identical ontology set, and replaces an operation type of a record including the above-mentioned identical function ontology of a designated AP with an operation type having a high appearance frequency (high frequency type) in the above-mentioned identical ontology set.

According to another aspect of the present invention, there is provided an information processing program for enabling a computer comprising an operation-definition storage unit which stores a record including a function name, a function ontology and an operation type, with respect to each of a plurality of applications (APs), to execute an operation modification process comprising the steps of acquiring from the above-mentioned operation-definition storage unit a set of records having an identical function ontology (identical ontology set) or a set of identifiers of the records belonging to the identical ontology set, and of replacing an operation type of a record including the above-mentioned function ontology of a designated AP with an operation type having a high appearance frequency (high frequency type) in the above-mentioned identical ontology set.

According to yet another aspect of the present invention, there is provided an information processing method comprising: storing a record including a function name, a function ontology and an operation type, with respect to each of a plurality of applications (APs); acquiring from the above-mentioned operation-definition storage unit a set of records having an identical ontology (identical ontology set) or a set of identifiers of the records belonging to the identical ontology set; and replacing an operation type of a record including the above-mentioned function ontology of a designated AP with an operation type having a high appearance frequency (high frequency type) in the above-mentioned identical ontology set.

Advantageous Effects of Invention

According to the present invention, it is possible to reduce the burden placed on the user in setting an operational interface of an information device.

BRIEF DESCRIPTION OF THE DRAWINGS

FIG. 3 shows examples of data in an operation-definition storage unit 17.

FIG. 9 shows examples of data in an external operation storage unit 51.

FIG. 10 shows an exemplary configuration of an information processing apparatus 10 of a third exemplary embodiment.

FIG. 11 shows a basic configuration of an information processing apparatus 10 according to the present invention.

DESCRIPTION OF EMBODIMENTS

In recent years, information devices intended primarily for personal use, such as a cellular phone, a PHS (Personal Handy-phone System), a PDA (Personal Digital Assistant) and a personal computer, have become in widespread use. The number of functions provided in these devices has been increasing. In general, with the increase in the number of functions provided in a device, the number of operation procedures required of the user to handle the respective functions increases.

Further, with the increase in the number of functions, keys and buttons specific to each function have become necessary to be provided so as to control each function, the number of buttons provided at an operation unit thus has been increasing, and their arrangement has been diversified.

Due to the above-mentioned situation, the user of such a device needs to perform diverse input operations in order to handle a number of functions provided in the device. Resulting from such diversification of operating procedures, it is desired to make it possible for the user to determine the operation procedures he or she performs.

However, on the occasion of determining the operation procedures desirable for the user, it is necessary to avoid placing a large burden upon the user. It is because if setting of operation procedures is complicated or difficult, the device is recognized as a difficult device to use in the end.

An information processing apparatus 10 or the like according to the present exemplary embodiment reduces the burden for the user in determining the operation procedures.

Figure 1:
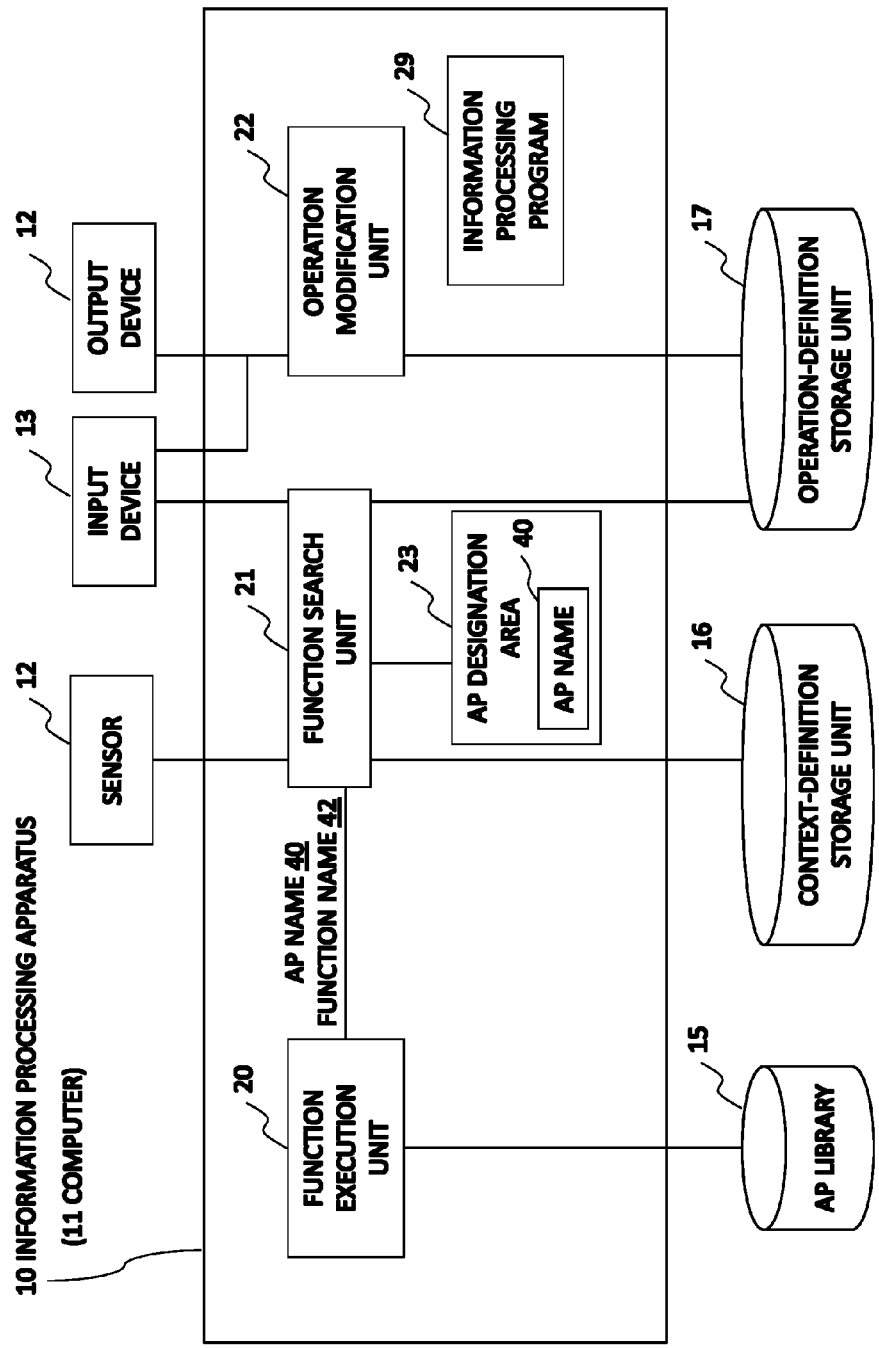
FIG. 1 shows an exemplary configuration of an information processing apparatus 10 of a first exemplary embodiment.

FIG. 1 shows an exemplary configuration of an information processing apparatus 10 of a first exemplary embodiment. Here, AP represents an application program.

The information processing apparatus 10 comprises a sensor 12, an input device 13, an output device 14, a function execution unit 20, a function search unit 21, an operation modification unit 22, an AP designation area 23, an AP library 15, a context-definition storage unit 16 and an operation-definition storage unit 17.

The sensor 12 is a position sensor using GPS (Global Positioning System) or the like, an acceleration sensor, or the like. The input device 13 is a set of operation buttons, a touch panel, a keyboard or the like. The output device 14 is a display device, a touch panel or the like.

The AP library 15, the context-definition storage unit 16 and the operation-definition storage unit 17 are provided in a storage device such as a disk and various sorts of memories.

The function execution unit 20 performs a specified function of a specified AP. Each AP is stored, for example, in the AP library 15. The function execution unit 20 launches an AP, specifying a function name 42 as an input parameter. A CPU (Central Processing Unit) of the information processing apparatus 10, which is not illustrated in the figures, executes the launched AP, and accomplishes the function specified as an input parameter.

On receiving from the input device 13 or the sensor 12 an operation signal generated through the user's depressing a button on the information processing apparatus 10, the user's swinging the information processing apparatus 10 or the like, the function search unit 21 identifies a function of the AP to be executed, and outputs the AP and the identified information on the function to the function execution unit 20. The operation modification unit 22 performs updating of the operation-definition storage unit 17 and thereby modifies an operational interface of the AP.

The function execution unit 20, the function search unit 21 or the operation modification unit 22 may be realized by dedicated hardware, and may also be realized by a CPU, not illustrated in the figures, of the information processing apparatus 10, which is also a computer 11, through its executing an information processing program 29 on the memory.

The AP designation area 23 is allocated on the memory and stores the AP name 40 of an AP which is the current subject of the user's operation. For example, a user-command input unit, which is not illustrated in the figures, inputs a command for launching an AP through the input device 13 and stores the AP name 40 in the AP designation area 23.

Figure 2:
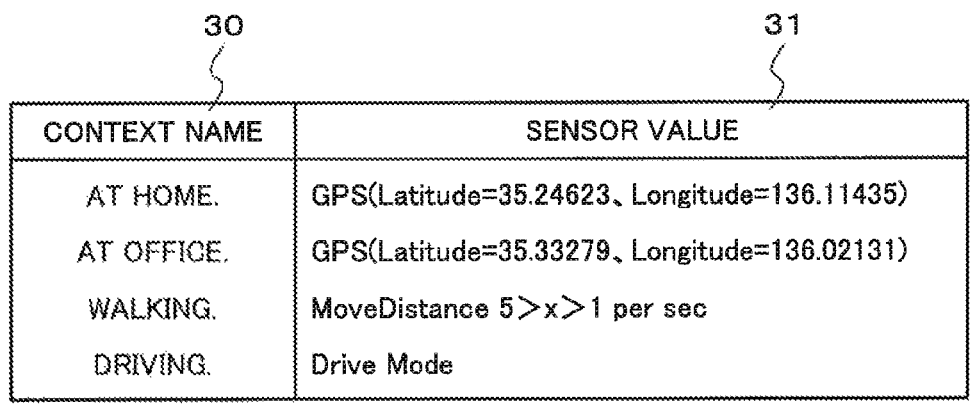
FIG. 2 shows examples of data in a context-definition storage unit 16.

FIG. 2 shows examples of data in the context-definition storage unit 16. The context-definition storage unit 16 stores context names 30 and sensor values 31 in a manner where a context name 30 is related to a sensor value 31. On receiving a measurement value defined as one of the sensor values 31 from one of the sensors 12, the function search unit 21 detects occurrence of a situation of a context name 30.

For example, on receiving a measurement value of "Latitude=35.24623, Longitude=136.11435" from a position sensor, the function search unit 21 detects the user's situation (context) of "at home". On receiving a measurement value reflecting movement at a speed within a predetermined range for a time longer than a predetermined period from an acceleration sensor, the function search unit 21 detects the situation of "walking".

FIG. 3 shows examples of data in the operation-definition storage unit 17. The operation-definition storage unit 17 stores an AP name 40 and one or more contexts 41, relating them to each of a plurality of APs. Further, the operation-definition storage unit 17 stores one or more records 45 including a function name 42, a function ontology 43 and an operation type 44, relating them to each of contexts 41 of each AP.

Each record 45 is identified by an identifier. The identifier is, for example, a serial number or a storage area address of each record 45 in the operation-definition storage unit 17. The identifier may be included in each record 45 as a data item.

Each record 45 expresses that when the corresponding AP name 40 is stored in the AP designation area 23, and the information processing apparatus 10 is in a situation represented by the corresponding context 41, performing an operation represented by an operation type 44 causes execution of a function represented by the corresponding function name 42 of an AP which is identified by the AP name 40. A value of a context 41 may be a value of a context name 30 or NULL (no context).

For example, when an AP name 40 of a phone call AP is stored in the AP designation area 23, and the context 41 detected by the function search unit 21 is NULL, the user's performing operation of "touch display" causes the function search unit 21 to determine to execute the "start phone call" function of the phone call AP.

The function ontology 43 is a name or the like which conceptually grasps the function of a function name 42 in the same record 45. A common function ontology 43 is used for functions which are similar between various APs. For example, a function ontology 43 of "AppStop" is commonly used with respect to a mail ending function of a mail AP and a browser ending function of a browser AP.

Figure 4:
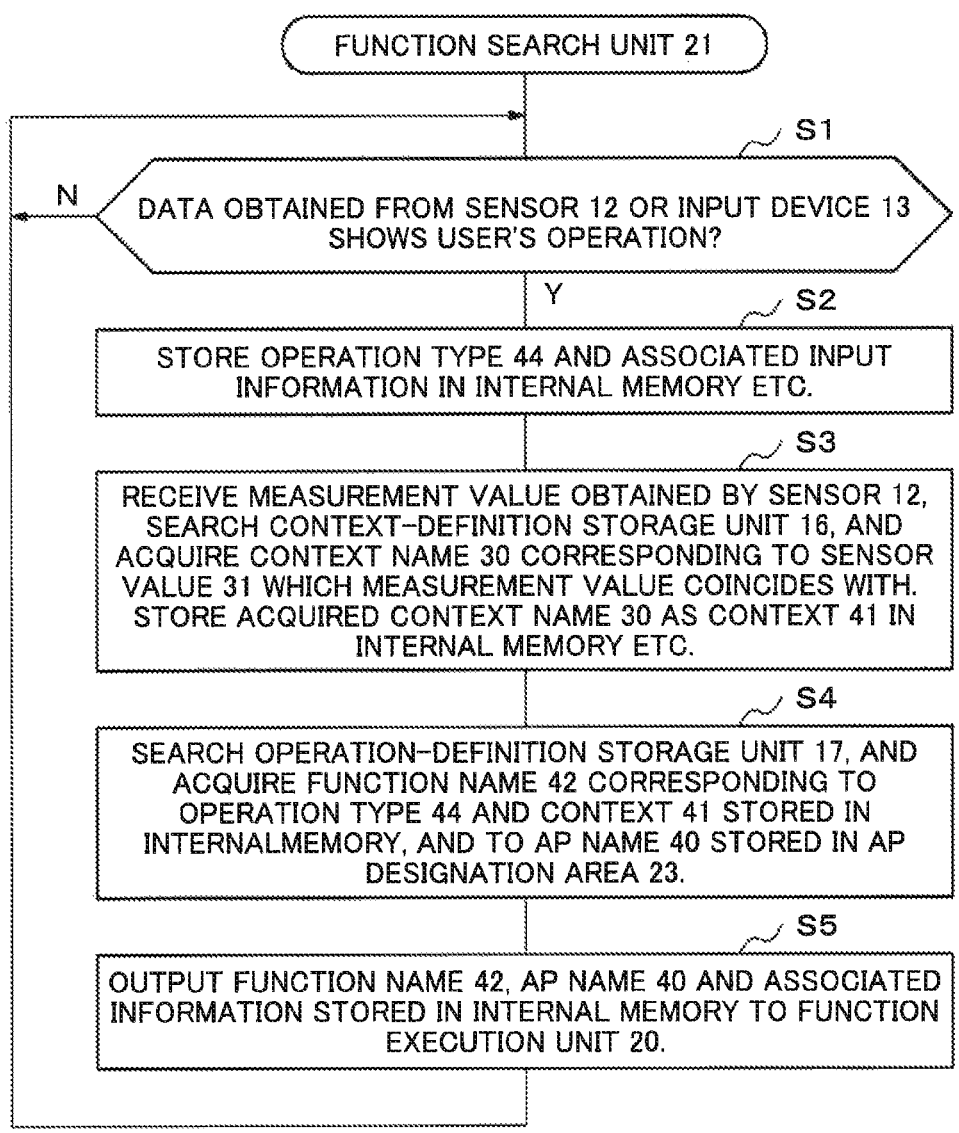
FIG. 4 shows an example of a flowchart for operation of a function search unit 21.

FIG. 4 shows an example of a flowchart for operation of the function search unit 21. The unit receives data obtained by the sensor 12 or the input device 13, and judges whether or not the data represents the user's operation (S1).

For example, when the user depresses a certain button of the input device 13, the function search unit 21 receives a signal corresponding to the depression of the button from the input device 13, and thereby judges that the user performed the operation of depressing the button. For example, when the user swings the information processing apparatus 10 twice, the function search unit 21 receives an acceleration signal from the sensor 12, and thereby judges that the user performed the operation of swinging twice.

When the user's operation is detected (Y at S1), the function search unit 21 stores an operation type 44 and associated input information in an internal memory or the like (S2). For example, when a command and a command parameter are inputted from the input device 13 such as a keyboard, an operation type 44 and associated information are stored, corresponding respectively to the command and the parameter. When the user's operation is not detected (N at S1), the function search unit 21 stands by for the user's operation (S1).

Next, the function search unit 21 receives a measurement value obtained by the sensor 12, and searches the context-definition storage unit 16, and thereby acquires a context name 30 corresponding to a sensor value 31 which the measurement value coincides with. The function search unit 21 stores the acquired context name 30 as a context 41 in an internal memory or the like (S3). When a sensor value 31 which the measurement value coincides with could not be found in the context-definition storage unit 16, the function search unit 21 stores NULL as a context 41 in the internal memory.

The function search unit 21 searches the operation-definition storage unit 17, and thereby acquires a function name 42 corresponding to the operation type 44 and the context 41, which are stored in the internal memory, and to the AP name 40 stored in the AP designation area 23 (S4). Then, the function search unit 21 outputs the function name 42, the AP name 40 and the associated information stored in the internal memory to the function execution unit 20 (S5), and then stands by for the next operation (S1).

Figure 5A:
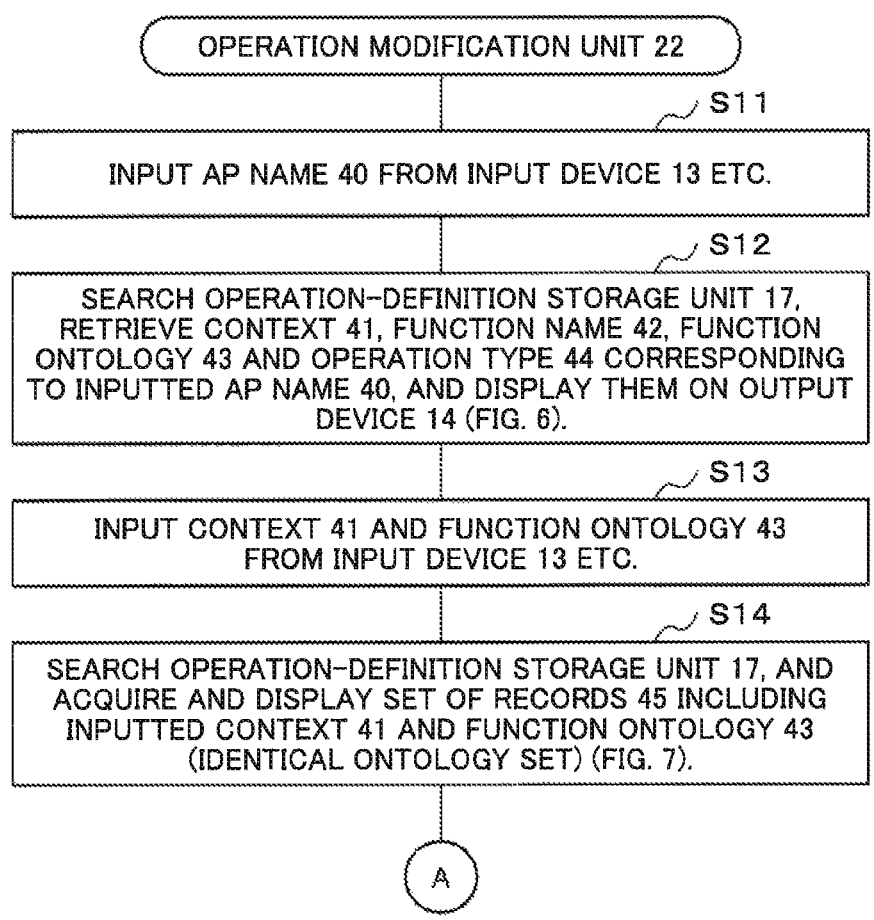
FIG. 5A shows an example of a flowchart for operation of an operation modification unit 22 (1/2).
Figure 5B:
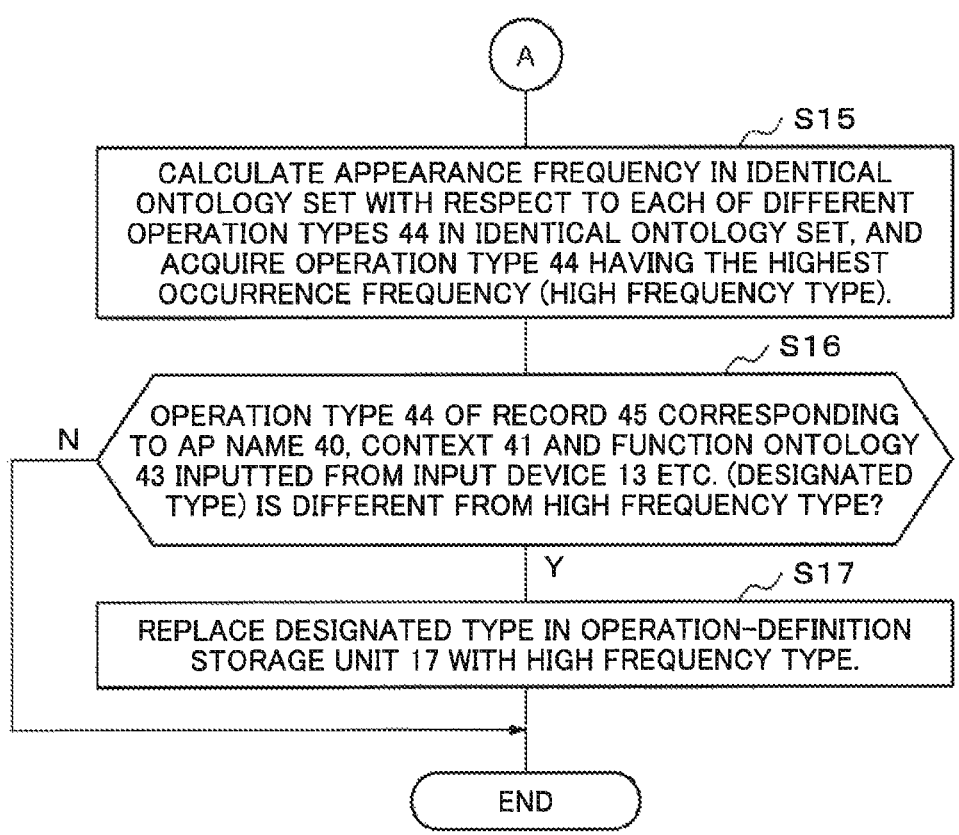
FIG. 5B shows an example of a flowchart for operation of an operation modification unit 22 (2/2).

FIGS. 5A and 5B show in combination an example of a flowchart for operation of the operation modification unit 22. The operation modification unit 22 receives an AP name 40 from the input device 13 or the like (S11). Here, the AP name 40 inputted to the operation modification unit 22 is, for example, the AP name 40 of an AP for which the user intends to modify an operation procedure.

Figure 6:
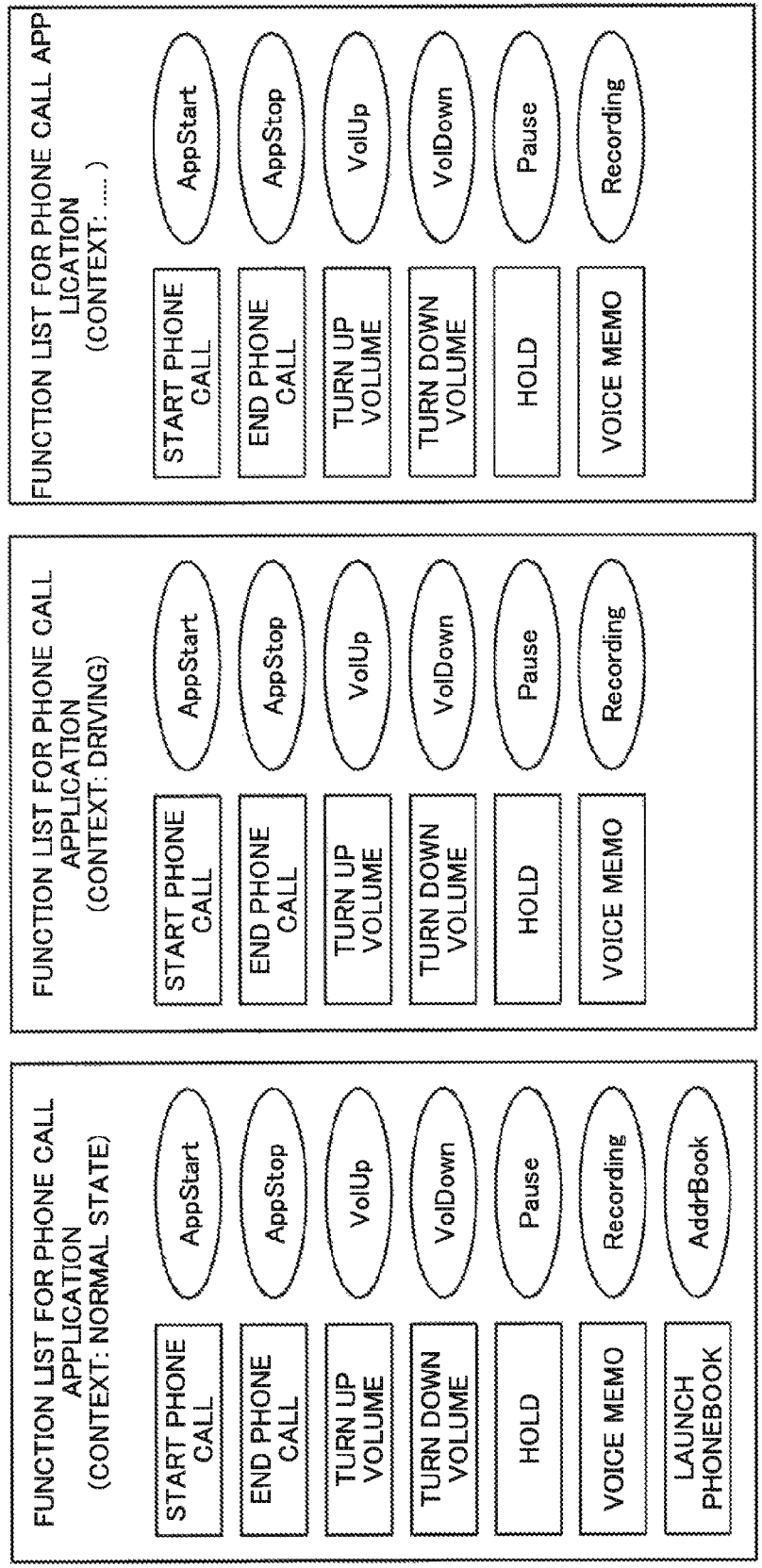
FIG. 6 shows examples of displayed function lists.

Searching the operation-definition storage unit 17, the operation modification unit 22 retrieves contexts 41, function names 42, function ontologies 43 and operation types 44 all of which correspond to the AP name 40, and displays them on the output device 14 (S12). FIG. 6 shows an example of the display (display of function lists).

Then, the operation modification unit 22 receives a context 41 and a function ontology 43 from the input device 13 or the like (S13). Here, the context 41 and the function ontology 43 inputted to the operation modification unit 22 are, for example, those selected from the displayed function lists by the user through the use of a touch panel, a mouse or the like. A context 41 may be acquired from a measurement value of the sensor 12 and the context-definition storage unit 16 by the use of the same method as the function search unit 21.

Further, the operation modification unit 22 may comprise a user interface through which only a context 41 is inputted and a function ontology 43 is not inputted. In this case, the unit 22 treats all function ontologies 43 of the designated AP as subjects of input procedure modification.

Figure 7:
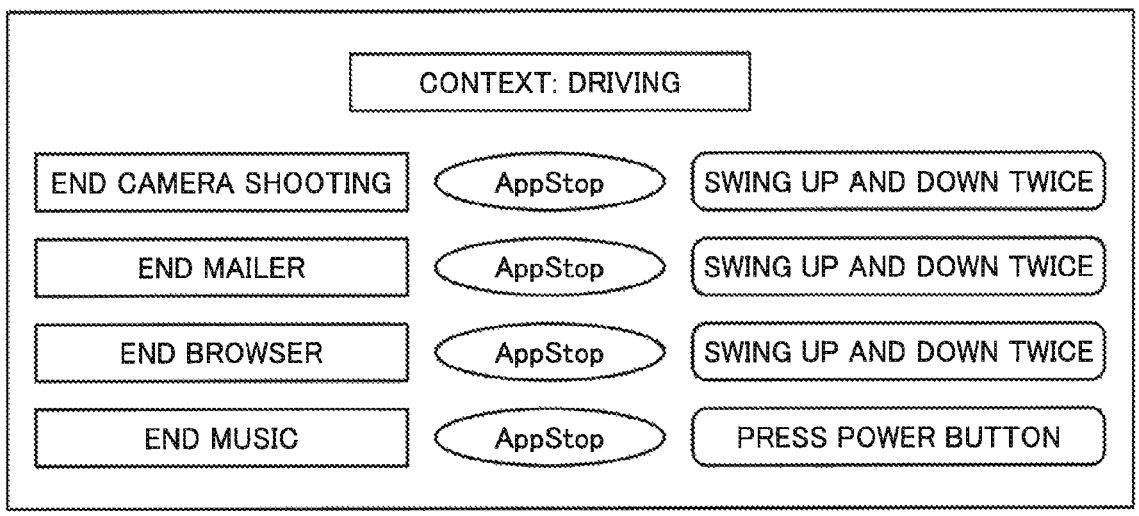
FIG. 7 shows an example of a displayed identical ontology set.

Searching the operation-definition storage unit 17, the operation modification unit 22 acquires a set of records including the inputted context 41 and function ontology 43 (identical ontology set) or a set of identifiers of the records 45 belonging to an identical ontology set, and displays the identical ontology set (S14). FIG. 7 shows an example of a displayed identical ontology set.

With respect to each of different operation types 44 in an identical ontology set, the operation modification unit 22 calculates an appearance frequency in the identical ontology set, and thereby acquires an operation type 44 of the highest occurrence frequency (S15). In the example shown in FIG. 7, there are three combinations for which the operation type of "swing up and down twice" is set (appearance frequency of 0.75) and one combination for which the operation type of "push POWER button" is set (appearance frequency of 0.25). Accordingly, the operation modification unit 22 acquires "swing up and down twice" as the operation type 44 of the highest occurrence frequency (high frequency type).

The operation modification unit 22 searches the operation-definition storage unit 17 for an operation type 44 (designated type) of a record 45 corresponding to the AP name 40, the context 41 and the function ontology 43 which were inputted from the input device 13 or the like, and judges whether or not the designated type is the same as the high frequency type (S16). If they are different from each other (Y at S16), the operation modification unit 22 replaces the designated type in the operation-definition storage unit 17 with the high frequency type (S17).

As a condition for replacing the designated type by the high frequency type, the operation modification unit 22 may add that the designated type and the high frequency type are displayed on the output device 14 and the user's permission for their replacement is inputted from the input device 13 or the like. As another one of the conditions, the operation modification unit 22 may add that the replacement is performed only if the appearance frequency of the high frequency type is equal to or larger than a predetermined threshold value (for example, 0.5). Further, the operation modification unit 22 may display on the output devices 14 all of one or more operation types 44 having appearance frequencies equal to or larger than a predetermined threshold value, and thereby enable the user to select a high frequency type.

The information processing apparatus 10 of the present exemplary embodiment can set operation procedures favorable to each user, without placing a large burden upon the user. Further, the information processing apparatus 10 of the present exemplary embodiment can save the user the trouble of searching for a large number of available operation types 44.

It is because the operation modification unit 22 analyzes a tendency of operation procedures which are already set by the user in the operation-definition storage unit 17, and thereby performs or proposes (presents a setting plan) setting of an operation type 44 which is common to the functions having an conceptually identical meaning (common function ontology 43).

Second Exemplary Embodiment

Figure 8:
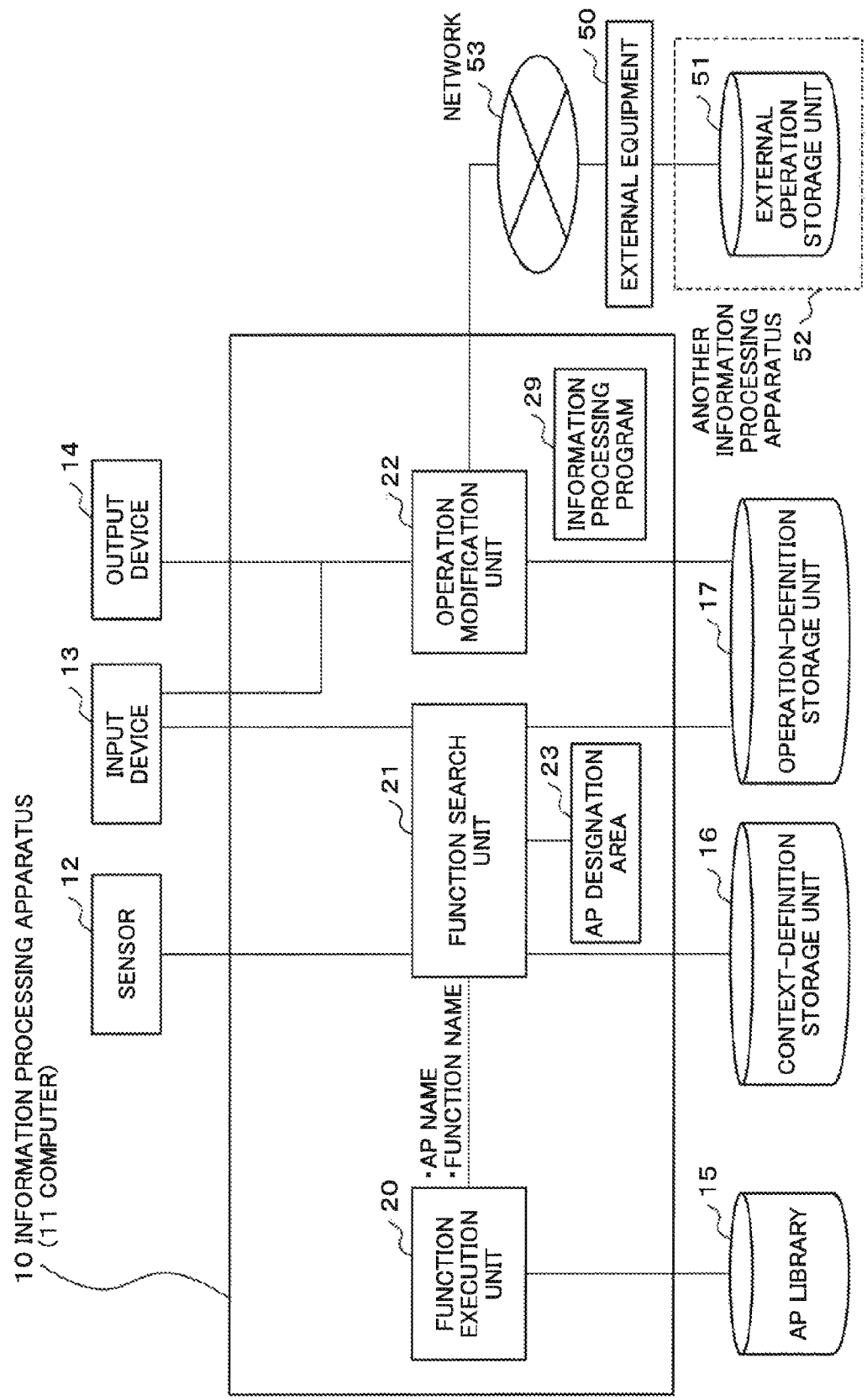
FIG. 8 shows an exemplary configuration of an information processing apparatus 10 of a second exemplary embodiment.

FIG. 8 shows an exemplary configuration of an information processing apparatus 10 of a second exemplary embodiment. The information processing apparatus 10 of the second exemplary embodiment is configured by adding an external operation storage unit 51 to the configuration of the first exemplary embodiment. The operation modification unit 22 accesses the external operation storage unit 51 via a network 53 and an external equipment 50. The function search unit 21 does not access the external operation storage unit 51. The operation modification unit 22 may be connected directly with the external operation storage unit 51.

Format of the data stored in the external operation storage unit 51 is the same as that of the data stored in the operation-definition storage unit 17. The external operation storage unit 51 may include data relevant to an AP which is different from the AP whose data is stored in the operation-definition storage unit 17, and may include also data relevant to the AP whose data is stored in the operation-definition storage unit 17. The external operation storage unit 51 may be an operation-definition storage unit 17 of another information processing apparatus 52. FIG. 9 shows an example of data stored in the external operation storage unit 51.

First Example of the Second Exemplary Embodiment

In the present exemplary embodiment, the operation modification unit 22 imports information which is not defined in the operation-definition storage unit 17 from the external operation storage unit 51. For example, in the situation where a record 45 corresponding to the context 41 of "walking" of a phone call AP is not stored in the operation-definition storage unit 17 (such as shown in FIG. 3), upon accessing the external operation storage unit 51 of FIG. 9, the operation modification unit 22 adds a record 45 corresponding to the above-mentioned context of the phone call AP. Other features of the information processing apparatus 10 of the present exemplary embodiment are the same as that of the first exemplary embodiment.

The information processing apparatus 10 of the present exemplary embodiment becomes able to perform setting of input procedures of an AP which have not been set by the user, without requiring the user's trouble of making manual entry. It is because the operation modification unit 22 acquires information to be stored in the operation-definition storage unit 17 from the external operation storage unit 51.

Second Example of the Second Exemplary Embodiment

In the present exemplary embodiment, the operation modification unit 22 searches, at step S14 in FIG. 5A, the external operation storage unit 51 in addition to the operation-definition storage unit 17, and thereby acquires an identical ontology set. When there is an overlap in an AP name 40 between the external operation storage unit 51 and the operation-definition storage unit 17, the operation modification unit 22 attaches suffixes or the like to the AP names to treat them distinctively. Further, in the present exemplary embodiment, there is a possibility that the operation modification unit 22 replaces an operation type 44 in the external operation storage unit 51 regarding it as a designated type (at S17 in FIG. 5B).

Other features of the information processing apparatus 10 of the present exemplary embodiment are the same as that of the first exemplary embodiment.

The information processing apparatus 10 of the present exemplary embodiment can perform setting of also an operation type 44 of an AP which is registered in another information processing apparatus 52, without requiring the user's trouble of making manual entry. Further, the information processing apparatus 10 of the present exemplary embodiment can set an operation type 44 of an AP registered in the information processing apparatus 10 by referring also to the information registered by the user in another apparatus (not limited to an information processing apparatus 10). It is because the operation modification unit 22 of the present exemplary embodiment regards also the external operation storage unit 51 as a subject of acquiring an identical ontology set, in addition to the operation-definition storage unit 17.

Third Exemplary Embodiment

FIG. 10 shows an exemplary configuration of an information processing apparatus 10 of a third exemplary embodiment. The information processing apparatus 10 of the third exemplary embodiment does not comprise a function execution unit 20 and an AP library 15. Instead, a peripheral device 60 comprises a function execution unit 62 and an AP library 63. The function execution unit 62 is connected with the function search unit 21 of the information processing apparatus 10 via a communication unit 61 and a network 53. The function execution unit 62 may be directly connected with the function search unit 21 of the information processing apparatus 10.

In the present exemplary embodiment, the function execution unit 62 acts as proxy in executing functions of the function execution unit 20. Other features of the information processing apparatus 10 of the present exemplary embodiment are the same as that of the first exemplary embodiment.

According to the present exemplary embodiment, operating procedures of an AP executed in one or a plurality of peripheral devices 60 can be set easily by the information processing apparatus 10.

FIG. 11 shows a basic configuration of the information processing apparatus 10 in the exemplary embodiment described above, according to the present invention. The information processing apparatus 10 comprises the operation-definition storage unit 17 and the operation modification unit 22. The operation-definition storage unit 17 stores a record 45 including a function name 42, a function ontology 43 and an operation type 44, with respect to each of a plurality of applications (APs).

The operation modification unit 22 acquires from the operation-definition storage unit 17 a set of records 45 having an identical function ontology 43 or a set of identifiers of the records 45 belonging to the aforementioned set, and replaces an operation type 44 of a record 45 including a designated function ontology 43 of a designated AP with an operation type 44 of high appearance frequency in the acquired identical ontology set. The information processing apparatus 10 of the present exemplary embodiment can reduce the burden placed upon the user in setting an operational interface.

Although the present invention has been described above with reference to the exemplary embodiments, the present invention is not limited to the above-described exemplary embodiments. Various changes and modifications which are understood by those skilled in the art may be made in the configurations and details of the present invention, within the scope of the present invention.

This application is based upon and claims the benefit of priority from Japanese Patent Application No. 2009-188971 filed on Aug. 18, 2009, the disclosure of which is incorporated herein in its entirety by reference.

INDUSTRIAL APPLICABILITY

The present invention is applicable, for example, to uses such as a cellular phone terminal which allows for individual settings of input procedures according with the user's preference, and a supporting system for input procedure setting which is provided in information devices such as a PHS, a PDA and a personal computer. Further, the present invention is applicable to uses such as an information device operation system which allows for operation of one or more information devices existing around the user from devices such as a cellular phone terminal, a PHS, a PDA and a personal computer, by the use of input procedures according with the user's preference.

REFERENCE SIGNS LIST 10 information processing apparatus
11 computer
12 sensor
13 input device
14 output device
15 AP library
16 context-definition storage unit
17 operation-definition storage unit
20 function execution unit
21 function search unit
22 operation modification unit
23 AP designation area
29 information processing program
30 context name
31 sensor value
40 AP name
41 context
42 function name
43 function ontology
44 operation type
45 record
50 external equipment
51 external operation storage unit
52 another information processing apparatus
53 network
60 peripheral equipment
61 communication unit
62 function execution unit
63 AP library

The invention claimed is:

1. An information processing apparatus, comprising:
an operation-definition storage device configured to store a record including a function name, a function ontology and an operation type, with respect to each of a plurality of APs which are applications; and
an operation modification unit configured to acquire from said operation-definition storage device an identical ontology set which is a set of records having an identical function ontology or a set of identifiers of the records belonging to said identical ontology set, and replace an operation type of a record including said identical function ontology of a designated AP with a high frequency type which is an operation type having a high appearance frequency in said identical ontology set;
a function search unit configured to search said operation-definition storage device for a record matching both an inputted AP name and an operation type of a detected operation, and output a function name of the extracted said record and said inputted AP name to a function execution unit which is configured to execute a function of an AP identified by the AP name and the function name;
a context-definition storage device configured to store a context name and a sensor value and to relate the context name and the sensor value to each other;
said operation-definition storage device configured to store said record with respect to each context of each of said plurality of APs;
said function search unit configured to:
acquire from said context-definition storage device a context corresponding to an inputted sensor value,
search said operation-definition storage device for said context, a record matching said context, for an inputted AP name, and for an inputted operation type, and
output a function name of the extracted said record and said inputted AP name to said function execution unit configured to execute a function of an AP identified by the AP name and the function name; and
said operation modification unit configured to acquire from said operation-definition storage device a set of records having both an identical context and an identical function ontology, as said identical ontology set.

2. The information processing apparatus according to claim 1, comprising:
an external operation storage device configured to store a record including a function name, a function ontology and an operation type, with respect to each of a plurality of APs identical with or different from said plurality of APs; and
said operation modification unit configured to acquire said identical ontology set from both said operation-definition storage device and said external operation storage device.

3. The information processing apparatus according to claim 1, wherein said high frequency type is an operation type having the highest appearance frequency among said identical ontology set or having an appearance frequency equal to or larger than a predetermined value.

4. An information processing system including: a peripheral device comprising said function execution unit, and the information processing apparatus according to claim 1.

5. A computer readable non-transitory medium storing the information processing program for enabling a computer, the computer comprising an operation-definition storage device which stores a record including a function name, a function ontology and an operation type with respect to each of a plurality of APs which are applications, to execute an operation modification process in which comprises the steps of:
acquiring from said operation-definition storage device an identical ontology set which is a set of records having an identical function ontology or a set of identifiers of the records belonging to said identical ontology set;
replacing an operation type of a record including said identical function ontology of a designated AP with a high frequency type which is an operation type having a high appearance frequency in said identical ontology set;
the information processing program further including a function search process wherein the computer is enabled to perform steps of:
searching said operation-definition storage device for a record matching both an inputted AP name and an operation type of a detected operation; and
outputting a function name of the extracted said record and said inputted AP name to a function execution unit executing a function of an AP identified by the AP name and the function name; and
storing a context name;
storing a sensor value relating the context name and the sensor value to each other and said operation-definition storage device for storing said record with respect to each of said plurality of AP names, to execute:

acquiring from said context-definition storage device a context corresponding to an inputted sensor value, of searching said operation-definition storage device for a record matching said context, an inputted AP name and an inputted operation type, and of outputting a function name of the extracted said record and said inputted AP name to said function execution unit executing a function of an AP identified by the AP name and the function name; and said operation modification process of acquiring from said operation-definition storage device a set of records having both an identical context and an identical function ontology, as said identical ontology set.

6. A computer readable non-transitory medium storing the information processing program according to claim 5 for enabling said computer, the computer further comprising an external operation storage device which stores a record including a function name, a function ontology and an operation type with respect to each of a plurality of APs identical with or different from said plurality of APs, to execute said operation modification process of acquiring said identical ontology set from both said operation-definition storage device and said external operation storage device.

7. A computer readable non-transitory medium storing the information processing program according to claim 5, wherein said high frequency type is an operation type having the highest appearance frequency among said identical ontology set or having an appearance frequency equal to or larger than a predetermined value.

8. A computer-implemented information processing method comprising the steps of:

storing in an operation-definition storage device a record including a function name, a function ontology and an operation type, with respect to each of a plurality of APs which are applications;

acquiring from said operation-definition storage device an identical ontology set which is a set of records having an identical function ontology or a set of identifiers of the records belonging to said identical ontology set;

the information processing program further including a function search process wherein the computer is enabled to perform steps of:

replacing an operation type of a record including said identical function ontology of a designated AP with a high frequency type which is an operation type having a high appearance frequency in said identical ontology set;

searching said operation-definition storage device for a record matching both an inputted AP name and an operation type of a detected operation;

outputting a function name of the extracted said record and said inputted AP name to a function execution unit executing a function of an AP identified by the AP name and the function name;

storing in a context-definition storage device a context name and a sensor value, relating them to each other;

storing said record in said operation-definition storage device, with respect to each context of each of said plurality of APs;

acquiring from said context-definition storage device a context corresponding to an inputted sensor value;

searching said operation-definition storage device for a record matching said context, an inputted AP name and an inputted operation type;

outputting a function name of the extracted said record and said inputted AP name to said function execution unit executing a function of an AP identified by the AP name and the function name; and acquiring from said operation-definition storage device a set of records having both an identical context and an identical function ontology, as said identical ontology set.

9. The information processing method according to claim 8 comprising the steps of:

storing in an external operation storage device a record including a function name, a function ontology and an operation type, with respect to each of a plurality of APs identical with or different from said plurality of APs; and acquiring said identical ontology set from both said operation-definition storage device and said external operation storage device.

10. The information processing method according to claim 8, wherein said high frequency type is an operation type having the highest appearance frequency among said identical ontology set or having an appearance frequency equal to or larger than a predetermined value.

11. An information processing apparatus comprising:

an operation-definition storage means configured for storing a record including a function name, a function ontology and an operation type, with respect to each of a plurality of applications (APs);

an operation modification means configured for acquiring from said operation-definition storage means a set of records having an identical function ontology set which is a set of records having an identical function ontology or a set of identifiers of the records belonging to said identical ontology set, and for replacing an operation type of a record including said identical function ontology of a designated AP with a high frequency type which is an operation type having a high appearance frequency in said identical ontology set;

a function search means configured to search said operation-definition storage means for a record matching both an inputted AP name and an operation type of a detected operation, and output a function name of the extracted said record and said inputted AP name to a function execution means which is configured to execute a function of an AP identified by the AP name and the function name;

a context-definition storage means configured to store a context name and a sensor value and to related the context name and the sensor value to each other;

said operation-definition storage means configured to store said record with respect to each context of each of said plurality of APs;

said function search means configured to acquire from said context-definition storage means a context corresponding to an inputted sensor value, and search said operation-definition storage means for said context, a record matching said context, an inputted AP name and an inputted operation type, and output a function name of the extracted said record and said inputted AP name to said function execution means configured to execute a function of an AP identified by the AP name and the function name; and said operation modification means configured to acquire from said operation-definition storage means a set of records having both an identical context and an identical function ontology, as said identical ontology set.

\* \* \* \* \*